United States Patent
Madhavan et al.

(10) Patent No.: US 7,672,937 B2
(45) Date of Patent: Mar. 2, 2010

(54) TEMPORAL TARGETING OF ADVERTISEMENTS

(75) Inventors: Anand Madhavan, Milpitas, CA (US); Shyam Kapur, Sunnyvale, CA (US)

(73) Assignee: Yahoo, Inc., Sunnyvale, CA (US)

( * ) Notice: Subject to any disclaimer, the term of this patent is extended or adjusted under 35 U.S.C. 154(b) by 364 days.

(21) Appl. No.: 11/786,238

(22) Filed: Apr. 11, 2007

(65) Prior Publication Data

US 2008/0255935 A1    Oct. 16, 2008

(51) Int. Cl.
G06F 17/30 (2006.01)
H04N 7/16 (2006.01)

(52) U.S. Cl. .......................................... 707/3; 725/29

(58) Field of Classification Search ................. None
See application file for complete search history.

(56) References Cited

U.S. PATENT DOCUMENTS

| | | | |
|---|---|---|---|
| 5,583,763 A | 12/1996 | Atcheson et al. | |
| 6,006,221 A | 12/1999 | Liddy et al. | |
| 6,009,409 A | 12/1999 | Adler et al. | |
| 6,026,368 A | 2/2000 | Brown et al. | |
| 6,076,088 A | 6/2000 | Paik et al. | |
| 6,102,969 A | 8/2000 | Christianson et al. | |
| 6,363,373 B1 | 3/2002 | Steinkraus | |
| 6,401,075 B1 | 6/2002 | Mason et al. | |
| 6,539,348 B1 | 3/2003 | Bond et al. | |
| 6,584,464 B1 | 6/2003 | Warthen | |
| 6,675,159 B1 | 1/2004 | Lin et al. | |
| 6,714,975 B1 | 3/2004 | Aggarwal et al. | |
| 6,772,150 B1 | 8/2004 | Whitman et al. | |
| 6,826,572 B2 | 11/2004 | Colace et al. | |
| 6,907,566 B1 | 6/2005 | McElfresh et al. | |
| 7,043,483 B2 | 5/2006 | Colace et al. | |
| 7,051,023 B2 | 5/2006 | Kapur et al. | |
| 7,146,416 B1 * | 12/2006 | Yoo et al. | 709/224 |
| 2003/0004781 A1 * | 1/2003 | Mallon et al. | 705/10 |
| 2003/0046161 A1 | 3/2003 | Kamangar et al. | |
| 2003/0066078 A1 * | 4/2003 | Bjorgan et al. | 725/34 |
| 2003/0149938 A1 | 8/2003 | McElfresh et al. | |
| 2004/0083133 A1 * | 4/2004 | Nicholas et al. | 705/14 |
| 2004/0093327 A1 | 5/2004 | Anderson et al. | |
| 2004/0186776 A1 | 9/2004 | Llach | |
| 2004/0249801 A1 | 12/2004 | Kapur | |
| 2005/0010477 A1 | 1/2005 | Sullivan et al. | |
| 2005/0071741 A1 * | 3/2005 | Acharya et al. | 715/500 |
| 2005/0080795 A1 | 4/2005 | Kapur et al. | |
| 2005/0102259 A1 | 5/2005 | Kapur | |
| 2005/0154746 A1 | 7/2005 | Liu et al. | |
| 2005/0228780 A1 | 10/2005 | Diab et al. | |
| 2006/0012294 A1 | 1/2006 | Christensen | |
| 2006/0074769 A1 * | 4/2006 | Looney et al. | 705/26 |
| 2006/0122979 A1 | 6/2006 | Kapur et al. | |
| 2006/0122994 A1 | 6/2006 | Kapur et al. | |
| 2006/0167896 A1 | 7/2006 | Kapur et al. | |
| 2006/0206474 A1 | 9/2006 | Kapur et al. | |
| 2006/0206476 A1 | 9/2006 | Kapur et al. | |
| 2007/0239452 A1 * | 10/2007 | Madhavan et al. | 704/252 |
| 2008/0127266 A1 * | 5/2008 | Ward et al. | 725/42 |
| 2008/0209351 A1 * | 8/2008 | Macadaan et al. | 715/762 |
| 2008/0249786 A1 * | 10/2008 | Oldham et al. | 705/1 |

\* cited by examiner

*Primary Examiner*—Uyen T. Le
(74) *Attorney, Agent, or Firm*—Brinks Hofer Gilson Lione

(57) ABSTRACT

A system and method utilize temporal targeting of content, such as advertisements. The targeting may be based on time of day, day of year, season or upcoming holidays. In addition, prior search history may be utilized to determine current popularity and/or predict future popularity for a particular concept that may be used for targeting.

25 Claims, 8 Drawing Sheets

TEMPORAL TARGETING OF ADVERTISEMENTS

BACKGROUND

Online advertising may be an important source of revenue for enterprises engaged in electronic commerce. A number of different kinds of page-based online advertisements are currently in use, along with various associated distribution requirements, advertising metrics, and pricing mechanisms. Processes associated with technologies such as Hypertext Markup Language (HTML) and Hypertext Transfer Protocol (HTTP) enable a page to be configured to contain a location for inclusion of an advertisement. An advertisement may be selected for display each time the page is requested, for example, by a browser or server application.

For a search engine or search website, advertisements may be associated with one or more of the search terms that are entered. A search term may also be referred to as a keyword or query. Advertisers may be given the option of purchasing an association with various search keywords for a fee. When the purchased search keywords are entered by a user, the advertiser's ads are shown on the results page for that search keyword. The fee for a search keyword may be a fixed rate or may be based on the number of times the search keyword is used, or be paid based on the number of times the advertisement is viewed or clicked on by a user. The display of advertisements may be based on targeting of the particular user or targeting based on the content of a page. If a targeted advertisement is not available based on the page content, then any randomly or otherwise selected advertisement may be shown. Accordingly, it may be helpful to target users even when advertisements are not available that target the page content.

BRIEF DESCRIPTION OF THE DRAWINGS

The system and/or method may be better understood with reference to the following drawings and description. Non-limiting and non-exhaustive embodiments are described with reference to the following drawings. The components in the figures are not necessarily to scale, emphasis instead being placed upon illustrating the principles of the invention. In the figures, like referenced numerals designate corresponding parts throughout the different views.

DETAILED DESCRIPTION

By way of introduction, the embodiments described below relate to a system and method for targeting content, and in particular, the temporal targeting of content, which may include advertisements. The content may be displayed on an electronic page, such as a web page. Content may refer to any text, image, figure, drawing, audio, video, or other display that may be viewed on a page, and may include advertisements. The use of advertisements may be described throughout, but is one example of content that may be targeted. The displayed content may be targeted based in part on a temporal consideration. In one embodiment, the targeting may be based on time of day, day of year, season or upcoming holidays. In addition, prior search histories may be utilized to determine current popularity and/or predict future popularity for a particular topic. The popularity may also be referred to as relevance, such that the relevance of topics may be a factor for selecting targeted advertisements related to those topics. Those topics that are the most popular may be deemed to be the most relevant.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims and be defined by the following claims. Nothing in this section should be taken as a limitation on those claims. Further aspects and advantages are discussed below in conjunction with the embodiments.

The principles described herein may be embodied in many different forms. The embodiments relate to a system and method for targeting based on a temporal consideration. Targeting may be based on a temporal indicator, such as the time, date, season, or may be determined based on an analysis of prior searching history or browsing history over a certain time period. The analysis of past searches may suggest those items that are likely to be the most popular and/or relevant for targeting. Accordingly, the consideration of a time or temporal component may be used in the targeting of content, such as advertisements.

Figure 1:
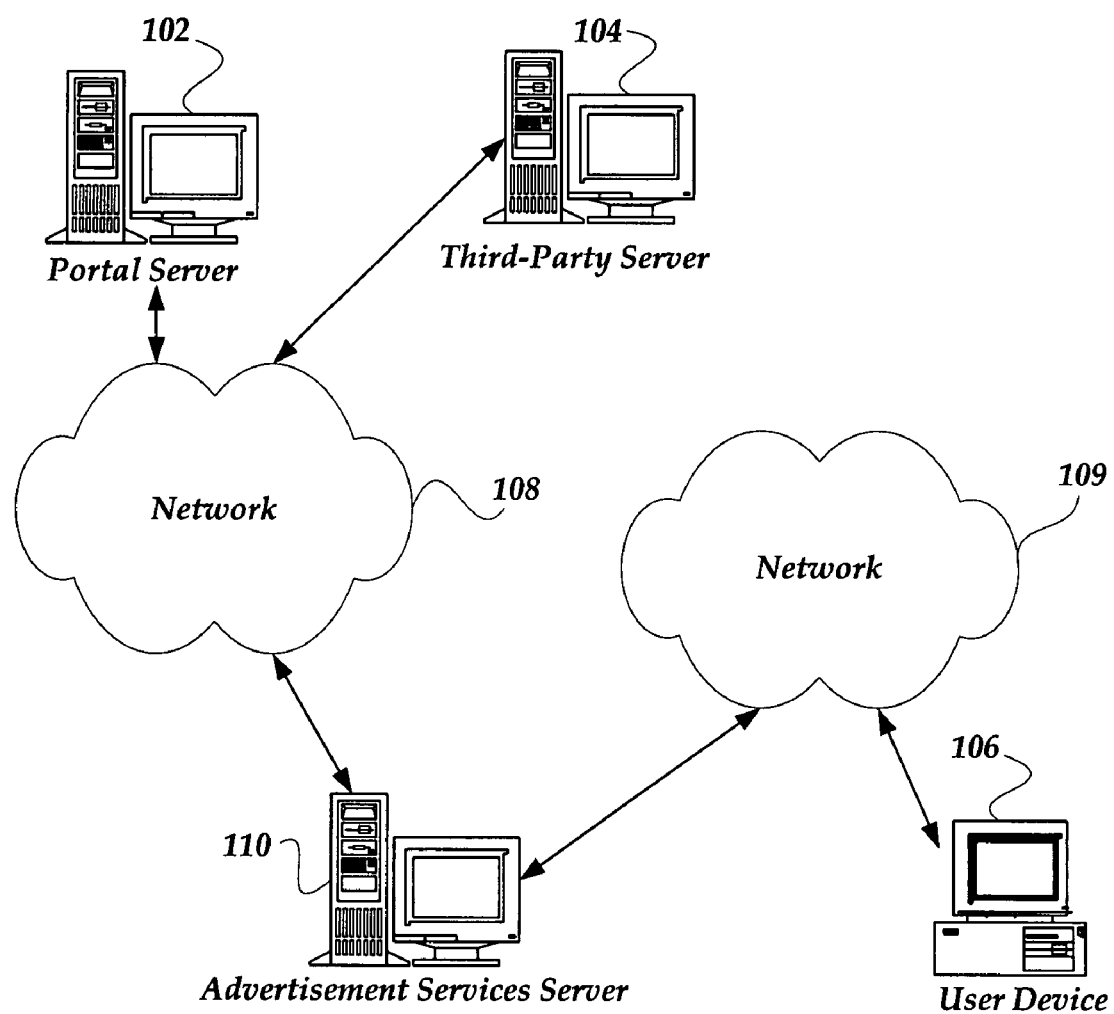
FIG. 1 provides a simplified view of one embodiment of an operating environment for advertising.

FIG. 1 provides a simplified view of a network environment 100. Not all of the depicted components may be required, however, and some embodiments of the invention may include additional components not shown in the figure. Variations in the arrangement and type of the components may be made without departing from the spirit or scope of the claims as set forth herein. Additional, different or fewer components may be provided. Herein, the phrase "coupled with" is defined to mean directly connected to or indirectly connected through one or more intermediate components. Such intermediate components may include both hardware and software based components.

As shown in FIG. 1, the environment 100 includes an advertisement services server 110, which provides a platform for selection, optimization, and/or distribution of advertisements for inclusion in pages, such as web pages (e.g. FIGS. 3, 8-11). The pages may be provided to users by a portal server 104 and/or a third-party server 102. In FIG. 1, users are represented by a user device 106, depicted as a conventional personal computer, and/or other device such as a mobile user device, including a network-enabled mobile phone, personal digital assistant (PDA), pager, network-enabled television, digital video recorder, such as TIVO®, and/or automobile. The user device 106 may be the user device described below with respect to FIG. 8.

Some or all of the advertisement services server 110, the portal server 104, and the third-party server 102 may be in communication with each other by way of a network 108 and may include the system or components described below with respect to FIG. 8. The advertisement services server 110 and the portal server 104 may each represent multiple linked computing devices, and multiple third-party servers, such as the third-party server 102, may be included in the network environment 100. The network 108 may include a public or private network connection, such as a virtual private network. The network 108 may include encryption or other security mechanisms employed over the public Internet.

The user device 106 may include a user-interactive device that typically runs a browser applications, and the like, to display requested pages received over a network. The user may be a consumer of goods of services that is searching for a business such as a business of the advertiser. User devices 106 are in communication with the portal server 104 and/or the third-party server 102 by way of the network 109. The user device 106 may be a computing device for a user to connect to a network 209, such as the Internet. Examples of a user device include but are not limited to a personal computer, personal digital assistant ("PDA"), cellular phone, or other electronic device. The user device 106 may be configured to access web pages or other data/information over the network 209 with a web browser, such as INTERNET EXPLORER® (sold by Microsoft Corp., Redmond, Wash.). The user device 106 may be a computer enabling a user to view web pages over the network 109, such as the Internet. In one embodiment, a user views the web browser containing data from the Internet. The data displayed on the browser may include advertisements. In an alternate embodiment, other software programs may also display advertisements received over the network 109 or from a different source.

The portal server 104, the third-party server 102, the advertisement services server 110, and/or the user device 106 represent computing devices of various kinds. Such computing devices may generally include any device that is configured to perform computation and that is capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, user device 106 may be configured to execute a browser application that employs HTTP to request information, such as a web page, from a web server, which may be a process executing on portal server 104 or third-party server 102.

The network 109 may be a separately implemented network from network 108 or may be the same network. The networks 108 and/or 109 may be the network discussed below with respect to FIG. 8. The networks 108, 109 may be configured to couple one computing device to another computing device to enable communication of data between the devices. Networks 108, 109 may generally be enabled to employ any form of machine-readable media for communicating information from one device to another. Each of networks 108, 109 may include one or more of a wireless network, a wired network, a local area network (LAN), a wide area network (WAN), a direct connection such as through a Universal Serial Bus (USB) port, and the like, and may include the set of interconnected networks that make up the Internet. The networks 108, 109 may be implemented using any communication method by which information may travel between computing devices. The advertisement services server 110 may be used for providing advertisements that are displayed to user device 106.

Figure 2:
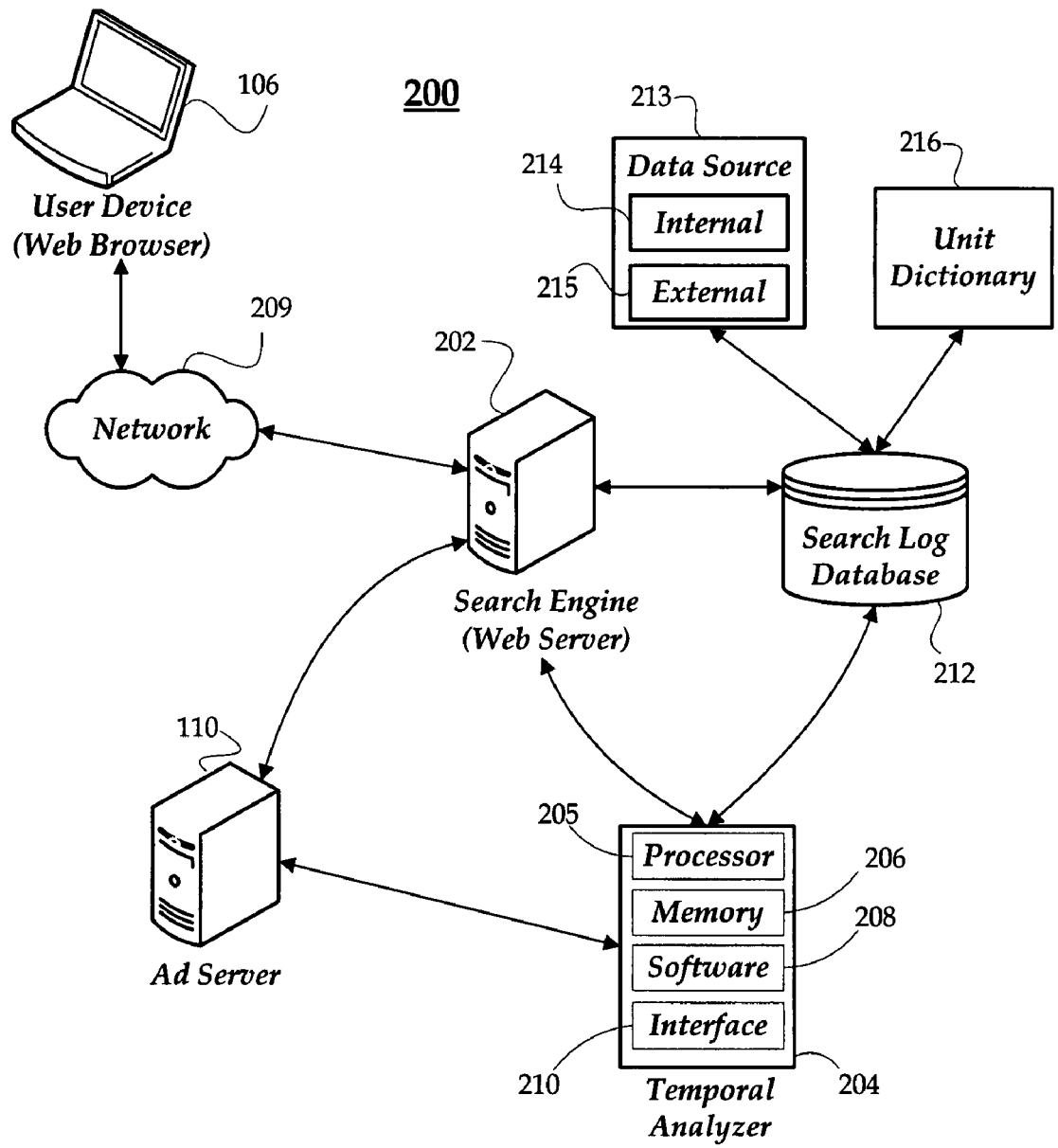
FIG. 2 is a block diagram of an exemplary user system.

FIG. 2 is a block diagram of one embodiment of an exemplary system 200 for content targeting. In particular, system 200 includes a network environment including a temporal analyzer 204 that may utilize a time component in the selection and display of content, such as advertisements. A user device 106 is coupled with a search engine 202 through the network 209. The search engine 202 is coupled with a search log database 212, and both are coupled with the temporal analyzer 204. The search log database 212 is coupled with a data source 213 and a unit dictionary 216. An ad server 110 may be further coupled with the search engine 202 and the temporal analyzer 204. Variations in the arrangement and type of the components may be made without departing from the spirit or scope of the claims as set forth herein. Additional, different or fewer components may be provided.

In one embodiment, the search engine 202 includes an interface, such as a web page, e.g., the web page which may be accessed on the World Wide Web at yahoo.com (operated by Yahoo! Inc., in Sunnyvale, Calif.), which is used to search for pages which are accessible via the network 209. The user device 106, autonomously or at the direction of the user, may input a search keyword (also referred to as a term or a query) for the search engine 202. A single search keyword may include multiple words or phrases, and a single search may include multiple search keyword. The search engine 202 may perform a search for the keyword or keywords and display the results of the search for the user device 106. The search engine 202 may also display advertisements that are relevant to the search and/or search results. The search engine 202 may include or be coupled with a search log database 212. The search log database 212 includes records or logs of at least a subset of the search keywords inputted in the search engine 202 over a period of time and may also be referred to as a search term database, keyword database or query database.

The search log database 212 may also be coupled with a data source 213. The data source 213 may be an internal source of data 214, external source of search data 215, and/or a combination of the two. An external data source 215 may include search results from other search engines or other sources. For example, a search engine, other than search engine 202, may be an external data source 215 and provide search logs to the search log database 212. An internal data source 214 may include search data or other data from the search engine 202 itself. Other data may include other searching or web browsing tendencies identified by the search engine 202.

The search log database 212 may also be coupled with a unit dictionary 216. The unit dictionary 216 may be a database of search keywords that are coupled with one another as units. A unit may be one or more search keywords that are grouped together. Units may also be referred to as concepts or topics and are sequences of one or more words that appear in search queries. For example, the search keyword "New York City law enforcement" may include two units, e.g. "New York City" may be one unit and "law enforcement" may be another unit. Units identify common groups of keywords to maximize the efficiency and relevance of search results. The categorization of search keywords into units is discussed in U.S. Pat. No. 7,051,023 issued May 23, 2006, entitled "SYSTEMS AND METHODS FOR GENERATING CONCEPT UNITS FROM SEARCH QUERIES," which is hereby incorporated by reference. In addition, U.S. Publication No. 2005/0080795 (application Ser. No. 10/797,614), entitled "SYSTEMS AND METHODS FRO SEARCH PROCESSING USING SUPERUNITS," U.S. Publication No. 2006/0122979 (application Ser. No. 11/006,466), entitled "SEARCH PROCESSING WITH AUTOMATIC CATEGORIZATION OF QUERIES," U.S. Publication No. 2006/012294 (application Ser. No. 11/006,463), entitled "AUTOMATIC GENERATION OF TAXONOMIES FOR CATEGORIZING QUERIES AND SEARCH QUERY PROCESSING USING TAXONOMIES," and U.S. Publication No. 2006/0167896 (application Ser. No. 11/295,166), entitled "SYSTEMS AND METHODS FOR MANAGING AND USING MULTIPLE CONCEPT NETWORKS FOR ASSISTED SEARCH PROCESSING," all of which are hereby incorporated by reference, also relate to the categorization of search keywords, such as by units.

In one embodiment, the unit dictionary 216 and the categorization of search keywords into units are used to analyze the search log database 212 to determine trends in searching. As discussed below, trends in searching may be used to identify those searches or topics that may become popular based on the analysis of search logs over time. The popularity may be associated with the relevance of a search and/or topic, such that the least popular topics may be deemed to be the least relevant.

An ad server 110 is coupled with the search engine 202 and is configured to provide advertisements to be displayed on the user device 106 with the search results. In one embodiment, advertisers pay a fee for particular keywords and whenever a user searches for that keyword, the advertiser's ad is displayed with the search results. The fee for any given keyword may be based upon its popularity with users. Accordingly, as the popularity of a keyword increases, so does the cost to advertisers to purchase ad space associated with that keyword. Conversely, the fee may be based on a bidding landscape where advertisers compete to be shown for that particular keyword, irrespective of the popularity of the keyword. The ad server 110 may include a database of available advertisements that are chosen by the ad server 110 and/or the search engine 202 for display on the user device 106. In one embodiment, when a user performs a search on the user device 106, the search is submitted to the search engine 202 over the network 209. The search request is recorded in the search log database 212. The results of the search are determined by the search engine 202 and the ad server provides the relevant advertisement for the particular search. The search results including the advertisements are then displayed on the user device 106.

In one embodiment, the search engine 202 and/or the search log database 212 may be coupled with the temporal analyzer 204. The temporal analyzer 204 analyzes the search log database 212 to identify trends over time in the keywords that are searched for by various users. In one embodiment, the temporal analyzer 204 identifies keywords that have a historical or current spike in the frequency with which the keyword is searched for. For example, each December, there may be a spike in queries for airplane tickets. In addition, a breaking news event may result in a spike in the frequency with which particular keywords are searched for. The monitoring of the search log database 212 may identify trends in those keywords that have increased over time or are currently increasing in popularity so that targeted advertisements that are related to those trends may be displayed.

The temporal analyzer 204 may include a processor 205, memory 206, software 208 and an interface 210. In one embodiment, the temporal analyzer 204 is a separate component from the search engine 202 and the ad server 110. In an alternate embodiment, any of the temporal analyzer 204, search engine 202, or the ad server 110 may be combined as a single component. The interface 210 may communicate with any of the search engine 202, search log database 212, or ad server 110. Alternatively, the interface 210 may be a user interface or user input configured to allow a user to interact with any of the components of the temporal analyzer 204. The temporal analyzer may also have a "keyword selection" module, which may select and/or reject the keywords based on the popularity for a given time. The sensitivity of a keyword (terrorism, adult, etc . . . ) may be one factor when a keyword is rejected for advertisements even if it is popular.

The processor 205 in the temporal analyzer 204 may be a central processing unit (CPU), a graphics processing unit (GPU), digital signal processor (DSP) or other type of processing device. The processor 205 may be a component in a variety of systems. For example, the processor 205 may be part of a standard personal computer or a workstation. The processor 205 may be one or more general processors, digital signal processors, application specific integrated circuits, field programmable gate arrays, servers, networks, digital circuits, analog circuits, combinations thereof, or other now known or later developed devices for analyzing and processing data. The processor 205 may operate in conjunction with a software program, such as code generated manually (i.e., programmed).

The processor 205 may be coupled with a memory 206, or the memory 206 may be a separate component. The interface 210 and/or software 208 may be stored in memory 206. The memory 206 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 206 includes a random access memory for the processor 205. In alternative embodiments, the memory 206 is separate from the processor 205, such as a cache memory of a processor, the system memory, or other memory. The memory 206 may be an external storage device or database for storing recorded image data. Examples include a hard drive, compact disc ("CD"), digital video disc ("DVD"), memory card, memory stick, floppy disc, universal serial bus ("USB") memory device, or any other device operative to store image data. The memory 206 is operable to store instructions executable by the processor 205. The functions, acts or tasks illustrated in the figures or described herein may be performed by the programmed processor executing the instructions stored in the memory 206. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multi-processing, multitasking, parallel processing and the like.

In one embodiment, the software 208, possibly including a browser may be stored in memory 206. The processor 205 is configured to execute the software 208. The browser may be a web browser-configured to display information and data retrieved from the Internet or other network. For example, the browser may be INTERNET EXPLORER® (sold by Microsoft Corp., Redmond, Wash.), or some other web browser. The browser may be configured to receive and display advertisements to the user while providing various content, such as the results from a keyword search or query.

Any of the components in system 200 may be coupled with one another through a network. For example, the temporal analyzer 204 may be coupled with the search engine 202, search log database 212, or ad server 110 via a network. Accordingly, any of the components in system 200 may include communication ports configured to connect with a network. Accordingly, the present disclosure contemplates a computer-readable medium that includes instructions or receives and executes instructions responsive to a propagated signal, so that a device connected to a network can communicate voice, video, audio, images or any other data over a network. The instructions may be transmitted or received over the network via a communication port that may be a part of the processor 205 or may be a separate component. The communication port may be created in software or may be a physical connection in hardware. The communication port may be configured to connect with a network, external media, display, or any other components in system 200, or combinations thereof. The connection with the network may be a physical connection, such as a wired Ethernet connection or may be established wirelessly as discussed below. Likewise, the additional connections with other components of the system 200 may be physical connections or may be established wirelessly.

The network or networks that may connect any of the components in system 200 may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols.

The interface 210 may be a user input or a display. The interface 210 may include a keyboard, keypad or a cursor control device, such as a mouse, or a joystick, touch screen display, remote control or any other device operative to interact with the temporal analyzer 204. The interface 210 may include a display coupled with the processor 205 and configured to display an output from the processor 205. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 205, or specifically as an interface with the software 208, such as a browser stored in the memory 206. The software 208, such as a browser that is in the display may include advertisements, which are visible to the user.

Figure 3:
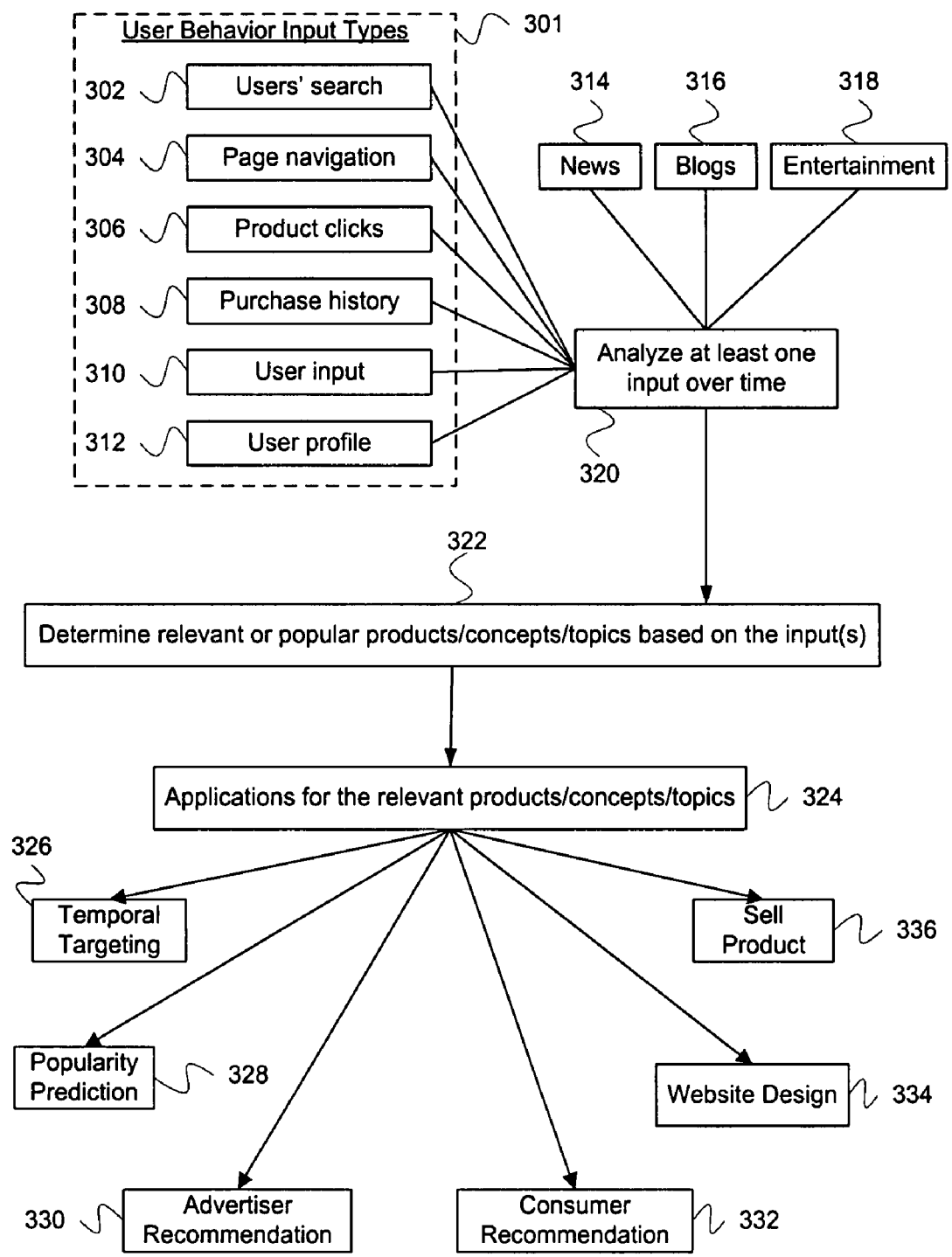
FIG. 3 is a flow chart illustrating one embodiment for identifying content.

FIG. 3 is a flow chart illustrating one embodiment for identifying content. In particular, based on a variety of inputs, certain topics may be identified that are or may become popular. Accordingly, the fluctuation of popularity, which may be referred to as a spike, is based at least in part on a time component. The topics may be referred to as concepts or areas, and they may be represented by user queries/searches, or may be representative of products/services, or targeted advertisements. A topic may be anything that may be expressed in words for a search query. Any product, service, news story, person, place, or thing may be some examples of any topic upon which people search.

A popularity of a topic may be identified based on the search queries related to that topic. The popularity of a topic may determine when content related to that topic is displayed in a page, such as a targeted advertisement related to the topic. Because of the time component, such advertisements may be referred to as temporal targeted advertisements. For example, an identified topic that is found to likely increase or spike in popularity may be used in selecting a targeted advertisement. In other words, advertisements may be targeted to that topic. Likewise, products or other content that are related to that topic may be identified and displayed more prominently on a page. Upon identification of the topics, there may be a variety of other applications in which the topics may be used.

Figure 4:
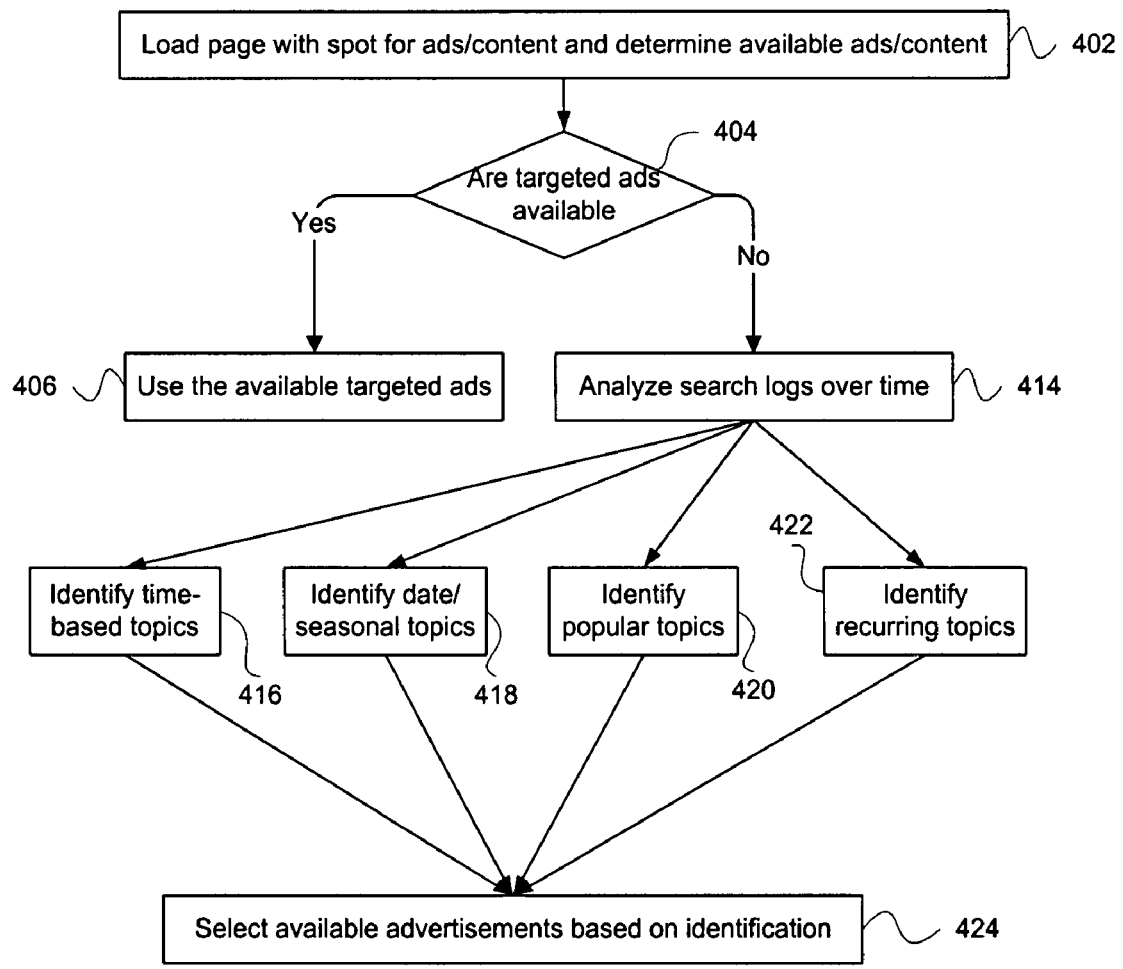
FIG. 4 is flow chart illustrating one embodiment of advertising.

There are a variety of inputs that may be used in determining the temporal popularity of a topic. In particular, historical data may be used to determine future use. For example, the search log database 212 may be used to anticipate or predict future searching. There may be a number of user behavior input types 301 that are available. The user behavior input types 301 reflect the behavior of a user over time as a way to predict future behavior and identify topics that may be popular. As discussed above, the search log database 212 may include historical search queries. The users' search 302 may be an input. In particular, the users' search 302 may illustrate pattern over time that suggest topics that may become popular. As discussed below, FIG. 4 is an illustration of one use of the search log database 212.

The user behavior input types 301 may also include page navigation 304, product clicks 306, and purchase history 308. Page navigation 304 may refer to the pages or items that a user may view or scroll over. The product clicks 306 may refer to the product pages or specific websites that a user views. The purchase history 308 may be a reflection of the goods and/or services that a user purchases. The page navigation 304, the product clicks 306, and/or the purchase history 308 are ways of monitoring a user's behavior to determine what topics are of interest to that user. Historical data of the page navigation 304, the product clicks 306 and/or the purchase history 308 may be stored in a database, such as the search log database 212 for future reference.

The user behavior input types 301 may also include a user input 310 and a user profile 312. The user input 310 may be any information that a user provides, such as data entered onto a website. The user profile 312 may include the information with which a user creates an online profile. For example, the user profile 312 may include sex, birthdate, location, and/or interests. Any information from the user profile 312 may be an input in determining what topics are or may become popular. The user profile 312 may be combined with other inputs to further specify which users prefer which content. For example, it may be helpful to determine that males prefer to view content related to food in the mornings, while females may prefer that content in the evenings. The user input 310 and/or the user profile 312 may be stored in a database, such as the search log database 212 for future reference.

Any additional information may be used as an input type for determining the popularity of topics or content. For example, news 314, blogs 316, and/or entertainment 318 may provide data for predicting the popularity of certain concepts. For example, if historical data suggested that whenever a hurricane was discussed in the news, then users viewed content on insurance, it would suggest that insurance is a popular concept whenever a hurricane is in the news. Likewise, blogs 316 or entertainment 318, such as movies, television shows, or sports may provide additional data for determining concepts that may be popular. News about entertainment 318 and the blogs 316 may be monitored to determine which topics are the most talked about.

In block 320, any of the inputs are analyzed over time. There may be several ways in which the inputs are analyzed over time. For example, recent spikes may be analyzed to determine which topics are being searched for more often at current time than in the past. Likewise, consistent spikes may reveal which topics spike during certain periods of time, such as the same period each year, day, etc. Alternatively, popularity may be combined with either demographics or categories to identify topics. For example, demographics may be combined with popularity to determine which topics males search for in the morning. Likewise, categories may be used to identify searches in a particular area. For example, the top searches for people interested in music may be relevant.

The analysis may include a pattern analysis of any of the inputs. The pattern analysis may be used to determine a user's or potential user's interests. In one embodiment, the analysis may include a determination of those topics that are the most popular as in block 322. As discussed above, the identified topics may be those areas that are or were popular. In one embodiment, topics may include any information that is displayed in any form on a page, such as a web page. The identification of topics may be used for a variety of applications as in block 324.

In one embodiment, the inputs may provide data that allows for temporal targeting as in block 326. Temporal targeting may refer to the selection and display of content, such as advertisements based at least in part on a time component. Content may be referred to as any online materials that are available to a user. For example, the news stories that are displayed on a web site may be dependent on the time of day, current or upcoming season and/or holiday. Alternatively, the advertisements displayed on a site may be targeted based on a time component and an identified topic. For example, Halloween or costume advertisements may be shown in October and swimsuits may be advertised in the late spring or early summer. Temporal targeting may be further achieved as discussed with respect to FIG. 5 and/or in blocks 416 and 418 of FIG. 4.

In one embodiment, the inputs may provide data that allows for popularity prediction as in block 328. The popularity may also be referred to as buzz that is generated based on a spike in popularity. One embodiment is described with respect to FIG. 6. The inputs may monitor what content, items, products, and/or topics have been the most popular over time and which products may be popular in the future based on historical or past popularity. Alternatively, the inputs may identify a rise in popularity, which may signify increased future popularity. Popularity prediction as in block 328 may be used in addition to any of the other applications from block 324. For example, popularity prediction may be used for providing recommendations on certain products.

In one embodiment, the inputs may provide data that allows for advertiser recommendation as in block 330 or consumer recommendation as in block 332. The popularity prediction in block 328 may be used to identify topics or products may become popular. Those topics that may be popular may be used to recommend that advertiser's provide targeted advertisements to those topics as in block 330. Likewise, a product that appears to be increasing in popularity may be recommended to customers as in block 332.

In one embodiment, the inputs may provide data that allows for website design as in block 334. The pages that a consumer views may be influenced by the inputs to personalize the pages for a particular user or users. The personalization of the pages may result in improved customer satisfaction. For example, if a user prefers viewing a certain category of pages, such as business related materials, then that category of pages may be given preference in the design of the page viewed by that user.

In one embodiment, the inputs may provide data that allows for product sales as in block 336. As discussed above, the inputs may provide evidence of which products may be or will become popular. For example, user search data may suggest that computer sales receive a 20% increase in sales following a WINDOWS® operating system release or upgrade. Accordingly, that input data may be used to determine that computer product sales may increase following a release. Such an identified product may be featured prominently on a web site, or may be advertised or recommended.

FIG. 4 is an illustration of one embodiment for advertising. In particular, FIG. 4 illustrates the selection of targeted advertisements based at least in part on search logs, such as from the search log database 212 of FIG. 2. The selection of targeted advertisements may be utilized on a web page or other electronic document. Advertisements may be targeted based on the content of the page or based on information about the user viewing the page. In a search engine page, the advertisements may be targeted based on a search query or search query results.

Figure 7:
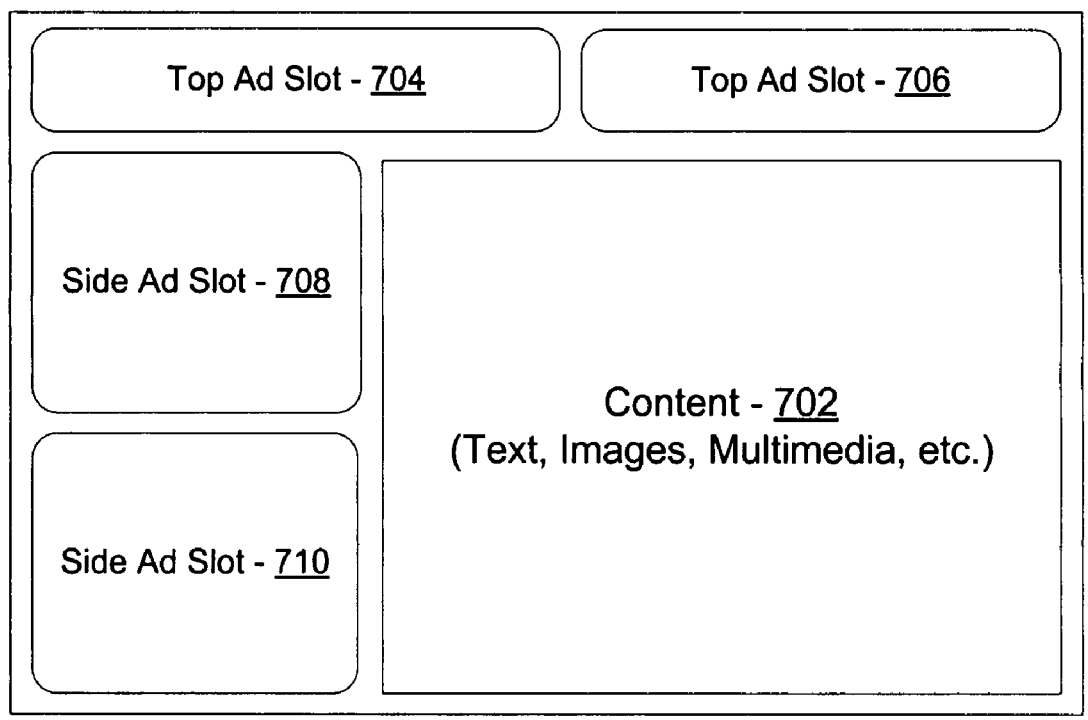
FIG. 7 is a block diagram of one embodiment of an exemplary page.

In block 402, the page including targeted advertisements or other content is loaded and available advertisements and/or content is determined. The content, such as advertisements may be displayed on a page. FIG. 7 is a block diagram of one embodiment of an exemplary page 700. Specifically, page 700 may be a web page available via the Internet, or may be a page or screen from any software program. The content 702 may be displayed in the center of the page 700. Page 700 may include multiple advertisements displayed around the main content 702. In one embodiment, there may be two top advertising slots 704, 706 for displaying advertisements at the top of the screen. Additionally, there may be two side advertising slots 708-710 displaying advertisement at the side of the screen. Advertisement slots may also be referred to as an advertising location or just an advertisement. FIG. 7 is merely exemplary of a screen or page displaying advertisements.

The content 702 that may be displayed may be an image, video, audio, other multimedia, text or any other visual display that may be included in a page. For example, the content 702 may include an image that links to other pages within the site. Although that content may not be categorized as an advertisement, it may still be targeted to a user. For simplicity, targeting advertisements will be described throughout this disclosure, rather than targeting of other content.

In block 404, it is determined whether targeted advertisements are available. As discussed above, search engine pages may target advertisements based on a search query or keyword. Other pages may include advertisements targeted based on the content of the page, such as through the CONTENT MATCH® system from YAHOO® located in Sunnyvale, Calif. Those advertisements are targeted based on the information that is available on the page. Alternatively, targeted advertisements may be based on user information such as any of the user behavior input types 301 from FIG. 3. If targeted advertisements are available, then those advertisements may be used as in block 406.

If other targeted advertisements are not available, then the search logs may be analyzed in block 414. In one embodiment, the search log database 212 includes historical search queries that are available for analysis. The search logs may be analyzed to identify different topics or concepts that may be targeted.

In one embodiment, the search logs may be analyzed to identify time-based topics as in block 416. In particular, time-based topics may be those areas that vary based on the time of day. For example, a user may be more likely to search for products or articles related to sleep problems during the night. Conversely, a user may view content related to stocks or stock quotes in the morning. Accordingly, the time of day may be used to identify those topics that may be most relevant at certain times of the day. The search logs may provide data to suggest which topics are most relevant at which time of day. The topics related to sleep problems may be most frequently searched at night, so the search logs provide an indication that it is a topic that should be targeted to users at night based on the search log evidence.

In one embodiment, the search logs may be analyzed to identify date and/or seasonal topics as in block 418. In particular, the time of year, season, or date may be used as temporal indicators to provide a way to further target users. For example, advertisements that may be targeted to a user based on the season, date, and/or upcoming holiday. Accordingly, in block 418, topics that may vary based on the season, date and/or holiday may be identified.

Figure 5:
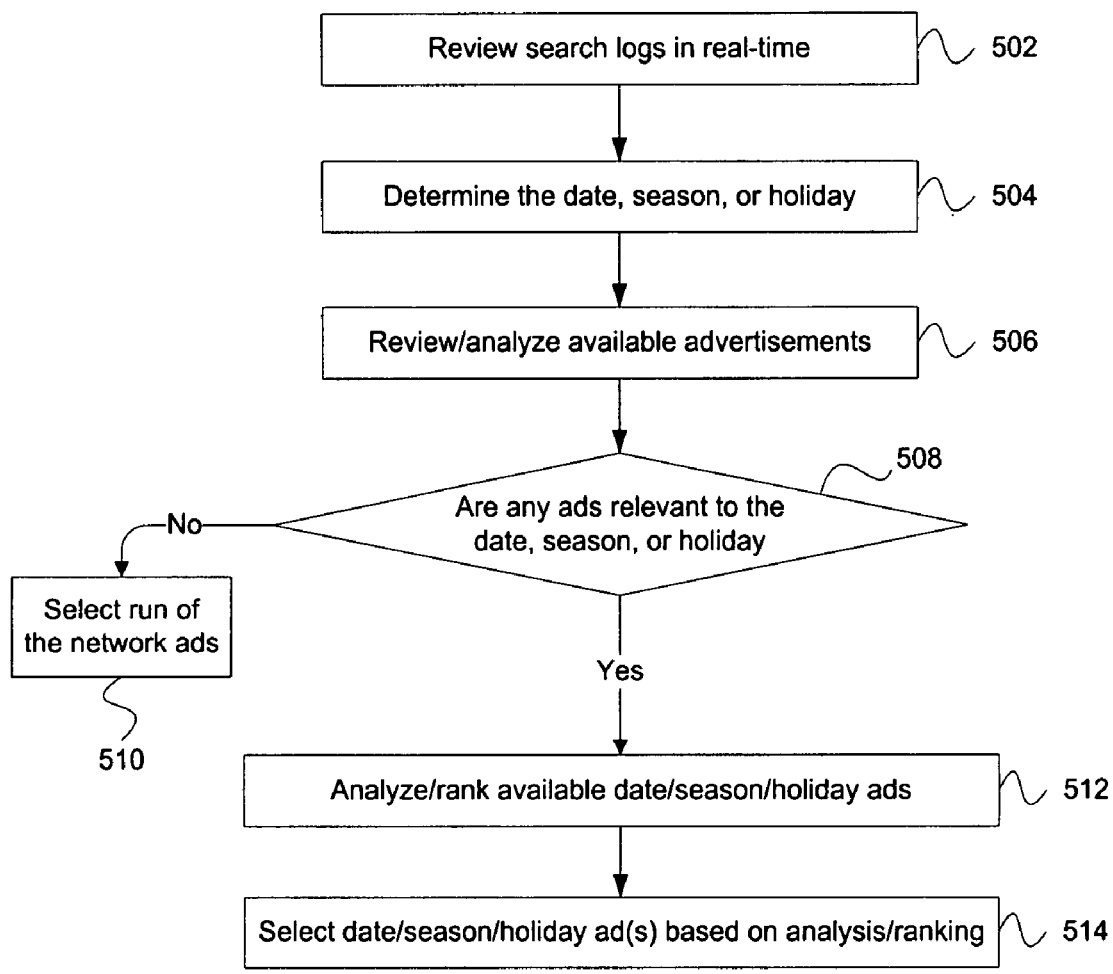
FIG. 5 is flow chart illustrating one embodiment of a selection of temporal based advertisements.

FIG. 5 illustrates one embodiment of a selection of temporal based advertisements. In particular, FIG. 5 illustrates selecting targeted advertisements based on date, season, and/or holiday. The season may be used to target those topics that are relevant to a particular season. For example, sunscreen, swimming, or beach products may be most relevant in the summer or towards the end of spring. Conversely, snowmobiles, snow shovels, or sidewalk salt may be more relevant in the winter. Accordingly, certain topics and/or products may be targeted for a particular season or date. In block 502, the search logs are reviewed to determine those topics that are most popular for a particular season or date. The search logs may include a history of search queries stored in a search log database 212. For example, shopping searches may be more common in November, so targeted advertisements on searching in November may be more popular. Likewise, an upcoming holiday may also provide a topic for targeting. For example, candy and costumes may be the topics of targeted advertisements in October.

In block 504, the current date, season, and/or upcoming holiday is determined. The date, season, and/or holiday may be used for targeting advertisements. In block 506, possible advertisements are reviewed or gathered. In block 508, the available advertisements are then analyzed to determine which advertisements are relevant to the determined date, season and/or holiday. If no ads are relevant for targeting the determined date, season and/or holiday, then run of the network (RON) advertisements may be selected as in block 510. RON advertisements may not be targeted advertisements.

If advertisements relevant to the determined season, date and/or holiday are available, then those advertisements are analyzed and ranked as in block 512. The advertisements may be ranked by an effective clicks per thousand advertisement impressions ("eCPM") model. The eCPM model may be a combination of the price the advertiser is willing to pay and the number of times users click on the advertisements. The ranking may be based on an analysis of the search logs that reveals which topics are most common during the past. For example, if the determined date is March 15, then the search logs that may be relevant are those from March 15 or surrounding days from the past several years. In one embodiment, the search logs may go back for 10 years of searching.

The most recent search logs are likely to be the most relevant and can be ranked according to recency. There may be a weight associated with the recency of an identified topic from a search log. The weight may be a nominal number minus how many years back you are considering. For example, if the nominal number is 12, then the weight for two years ago is 10, and the weight for seven years ago is 5. Accordingly, using the nominal number of twelve, the weight from two year old search logs is double the weight from seven year old search logs. In one embodiment, the rating may be a measure of popularity of the topic or advertisement. For example, if March 15 includes an unusually high number of searches related to St. Patrick's Day then that topic may be identified and ranked higher, such that targeted advertisements related to St. Patrick's Day may be ranked very high. In block 514, the targeted advertisement(s) that are ranked highest may be selected for display to a user.

Referring back to FIG. 4, in one embodiment, the search logs may be analyzed to identify popular topics as in block 420. As discussed above, popular topics may be identified through different ways including an analysis of search logs, and those identified topics may then be used in various applications. In particular, topics that have a spike in popularity (also referred to as buzz) may be identified. U.S. patent application Ser. No. 11/607,299, entitled "KEYWORD BIDDING STRATEGY FOR NOVEL CONCEPTS" and filed on Nov. 30, 2006, the disclosure of which is hereby incorporated by reference, relates to the identification of novel concepts that experience an increase in popularity.

Figure 6:
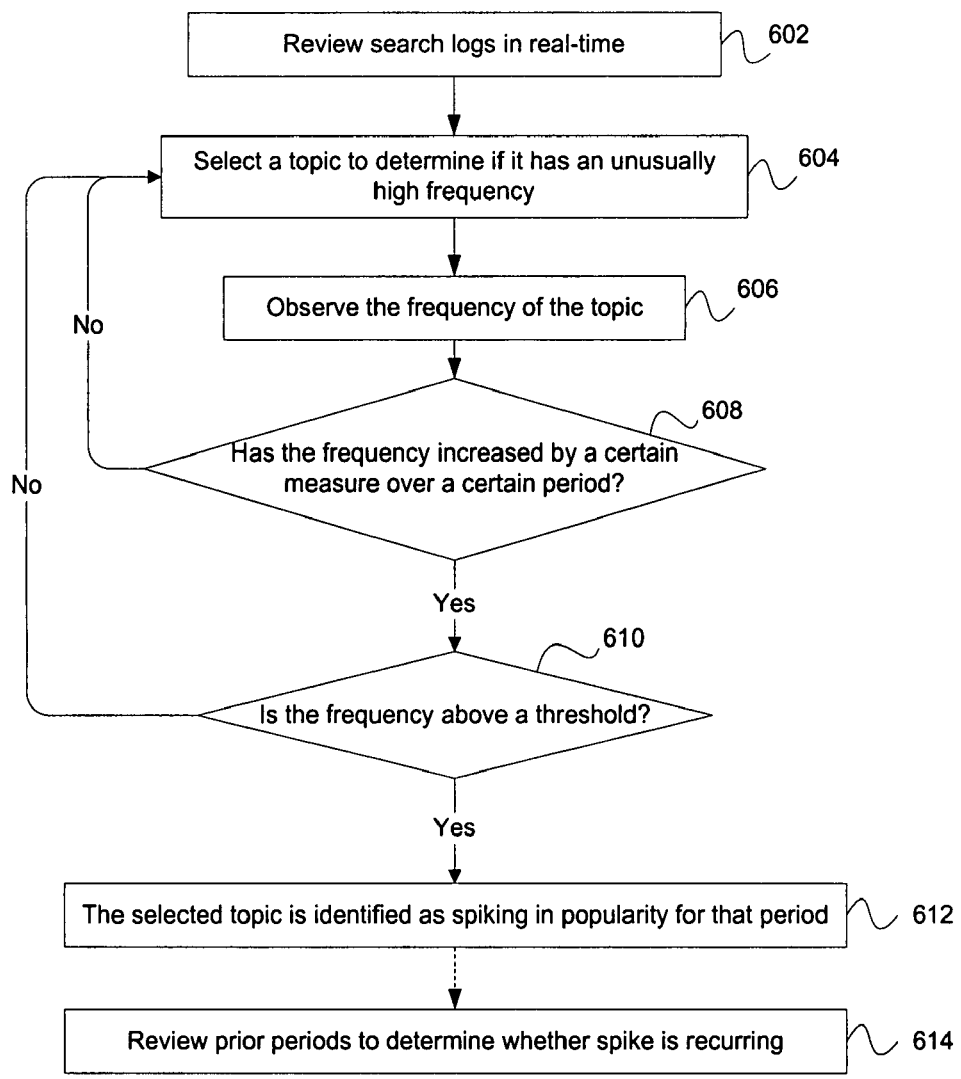
FIG. 6 is flow chart illustrating one embodiment of identifying topics experiencing a spike in popularity.

FIG. 6 illustrates one embodiment of identifying topics experiencing a spike in popularity. In block 602, search logs may be reviewed. In block 604, a topic is selected to determine if it has experienced a spike in popularity. A topic may be a search query or search term that is identified in the search logs. The search logs may include a history of search queries that includes a frequency for the number of searches for each search query. In block 606, the selected topic may be observed in the search logs to determine the frequency with which it has been the subject of a search query.

The frequency of the topic being used as a search query may be reflective of its popularity. In block 608, the frequency increase is measured over a period of time to determine if that increase is above a certain measure. For example, if the frequency over the past hour has increased over 200% over the frequency of the previous three hours, that may be an indication of a spike in popularity. If the frequency increase is not above the certain measure, then a different topic may be selected. If the frequency increase is above the certain measure, then a determination is made as to whether the frequency is above a threshold as in block 610. The frequency threshold may be used to identify those topics that are very uncommon in search queries, so that a few search queries would otherwise indicate a spike in popularity. For example, the threshold may require at least two search queries in the most recent ten time periods. If the frequency threshold is not met in block 610, then a different topic may be selected. If the frequency threshold is met in block 610, then the selected topic is identified as having a spike in popularity as in block 612.

In alternate embodiments, the selected topic with a spike in popularity may be analyzed to determine if the spike in popularity is recurring as in block 614. For example, the spike in popularity may recur each year, or each month, which allows for a prediction of a future spike in popularity. News events may be a one-time spike in popularity; however, other time-based topics may be recurring. Referring back to FIG. 4, the search logs may be analyzed to identify recurring topics as in block 422. Identification of recurring topics may be utilized to predict future popularity. Advertisements may be targeted at those topics when it is determined they will again become the most popular.

In FIG. 4, various topics are identified that may be utilized for targeting of content, such as advertisements. Time-based topics in block 416, date/season/holiday topics in block 418, popular topics in block 420, and/or recurring topics in block 422 are ways of identifying topics which may be targeted. In block 424, one or more of those ways may be used to identify one or more topics for selecting a targeted advertisement.

Figure 8:
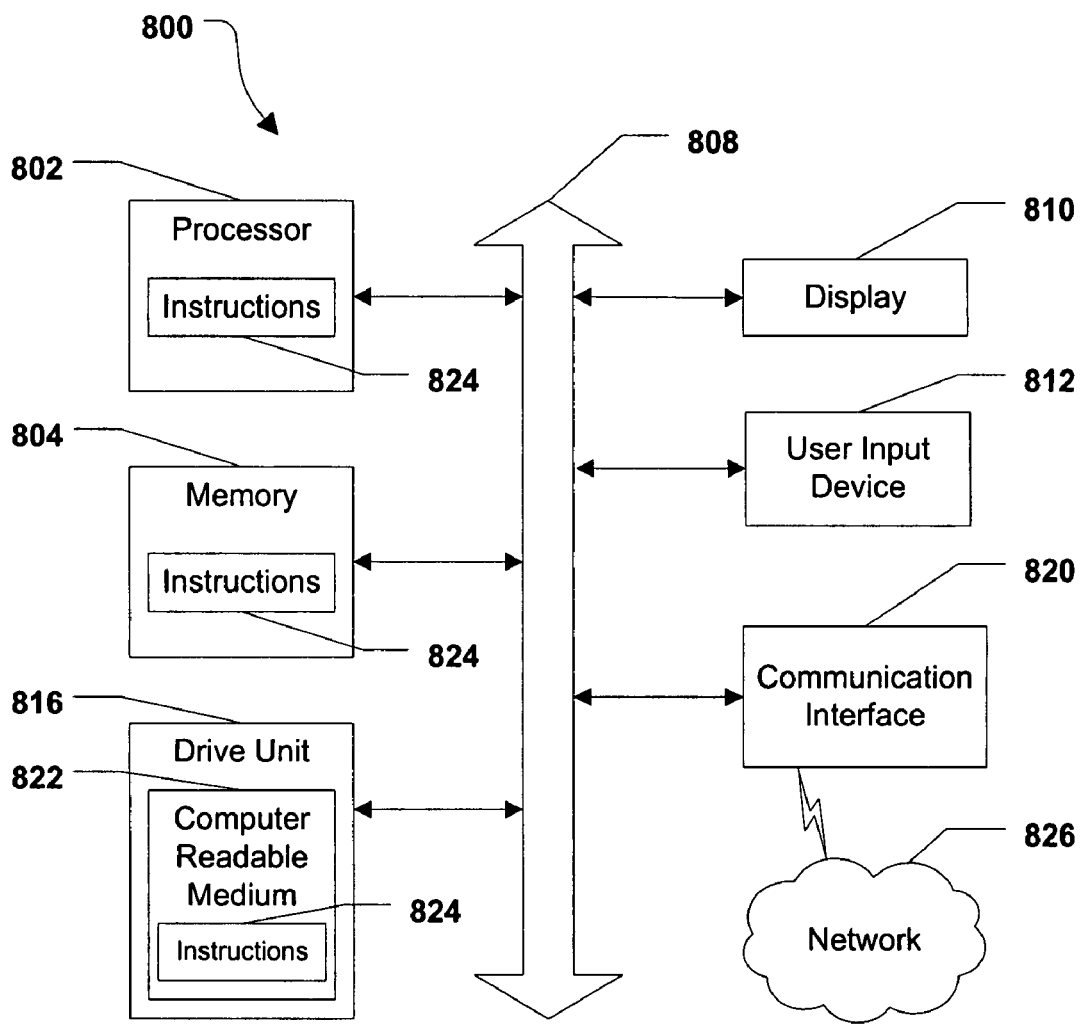
FIG. 8 is an illustration a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 804 includes a cache or random access memory for the processor 802. In alternative embodiments, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein may be performed by the programmed processor 802 executing the instructions stored in the memory 804. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 800 may further include a display unit 814, such as a liquid crystal display (LCD), an organic light emitting diode (OLED), a flat panel display, a solid state display, a cathode ray tube (CRT), a projector, a printer or other now known or later developed display device for outputting determined information. The display 814 may act as an interface for the user to see the functioning of the processor 802, or specifically as an interface with the software stored in the memory 804 or in the drive unit 806.

Additionally, the computer system 800 may include an input device 816 configured to allow a user to interact with any of the components of system 800. The input device 816 may be a number pad, a keyboard, or a cursor control device, such as a mouse, or a joystick, touch screen display, remote control or any other device operative to interact with the system 800.

In a particular embodiment, as depicted in FIG. 8, the computer system 800 may also include a disk or optical drive unit 806. The disk drive unit 806 may include a computer-readable medium 810 in which one or more sets of instructions 812, e.g. software, can be embedded. Further, the instructions 812 may embody one or more of the methods or logic as described herein. In a particular embodiment, the instructions 812 may reside completely, or at least partially, within the memory 804 and/or within the processor 802 during execution by the computer system 800. The memory 804 and the processor 802 also may include computer-readable media as discussed above.

The present disclosure contemplates a computer-readable medium that includes instructions 812 or receives and executes instructions 812 responsive to a propagated signal, so that a device connected to a network 820 can communicate voice, video, audio, images or any other data over the network 820. Further, the instructions 812 may be transmitted or received over the network 820 via a communication port 818. The communication port 818 may be a part of the processor 802 or may be a separate component. The communication port 818 may be created in software or may be a physical connection in hardware. The communication port 818 is configured to connect with a network 820, external media, the display 814, or any other components in system 800, or combinations thereof. The connection with the network 820 may be a physical connection, such as a wired Ethernet connection or may be established wirelessly as discussed below. Likewise, the additional connections with other components of the system 800 may be physical connections or may be established wirelessly.

The network 820 may include wired networks, wireless networks, or combinations thereof. The wireless network may be a cellular telephone network, an 802.11, 802.16, 802.20, or WiMax network. Further, the network 820 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A computerized method for selecting a targeted advertisement, the method comprising:
   determining a temporal indicator;
   receiving, over a network, a set of available advertisements that are dependent on the temporal indicator;
   analyzing, with a processor, the set of available advertisements to determine advertisements relevant with respect to a time period indicated by the temporal indicator, wherein the relevance is measured by reviewing a search log database to determine a frequency with which a topic from the advertisement is found, from the search log database, in historical search queries that correspond with the time period indicated by the temporal indicator, further wherein the correspondence with the time period comprises at least one of a similar season, a similar date, or a similar time of day;
   selecting the targeted advertisement from the set of available advertisements, wherein the targeted advertisement is selected by the processor based on the analysis to include the relevant advertisements; and
   providing the selected targeted advertisement for display.

2. The method according to claim 1 wherein the temporal indicator comprises a date and a time of day.

3. The method according to claim 1 wherein the temporal indicator comprises a season.

4. The method according to claim 1 wherein the similar date identifies at least one of a season, holiday, day of week, or combinations thereof.

5. The method according to claim 1 wherein at least one advertisement from the set of available advertisements is associated with search results from a search query.

6. The method according to claim 1 wherein the correspondence comprises comparing a current date indicated by the temporal indicator with a past date, wherein the past date is from a previous year to the current date, further wherein the past date comprises the similar date when it corresponds with the current date.

7. The method according to claim 6 wherein the analysis comprises identifying a popular historical search query from the past date.

8. The method according to claim 1 further comprising:
identifying, for each of the set of available advertisements, at least one topic related to the advertisement; and
determining a current relevance, an expected relevance, or a combination thereon of the at least one topic for each of the set of available advertisements;
wherein the targeted advertisement is selected based on the determined current relevance, the expected relevance, or a combination thereof.

9. The method according to claim 8 wherein the current relevance reflects a current popularity and the expected relevance reflects an expected popularity.

10. In a computer readable storage medium having stored therein data representing instructions executable by a programmed processor for determining a spike in popularity of a search query, the storage medium comprising instructions operative for:
analyzing at least one search log, wherein the at least one search log includes a plurality of search queries, wherein the analysis includes reviewing the plurality of search queries over time;
reviewing a frequency for at least some of the plurality of search queries;
determining when the at least some of the plurality of search queries experience a spike in relevance over time based on the reviewed frequency;
identifying a topic for each search query of the plurality of search query that has previously experienced the spike in relevance;
identifying a time from which the identified topic experienced the spike in relevance;
analyzing the time from which the identified topic experienced the spike to determine when a spike will reoccur; and
selecting an advertisement for the topic when the identified time for the spike will reoccur based on the analysis.

11. The storage medium according to claim 10 wherein the identified time includes at least one of a season of the experienced spike, a time of day of the experienced spike, a day of a week of the experienced spike, or a date of the experienced spike.

12. The storage medium according to claim 11 wherein the reoccurrence is predicted from the identified time of the experienced spike.

13. The storage medium according to claim 11 wherein the identified time comprises the date of the experienced spike, further wherein the spike in popularity may be predicted based on the recurrence of popularity on the recurring date.

14. The storage medium according to claim 10 wherein the determination of the spike in popularity includes reviewing historical search logs.

15. The storage medium according to claim 10 wherein the spike in popularity may be predicted based on a recurrence of popularity on a recurring time.

16. A computer system displaying search results with an advertisement, the system comprising:
a search engine configured to provide the search results for a search keyword;
a search log database coupled with the search engine and configured to receive the search keyword that is searched in the search engine, wherein the search log database stores a plurality of search keywords that are searched over a period of time and stores a time that each search keyword of the plurality of search keywords is searched;
a temporal analyzer coupled with the search log database and configured to analyze the search log database to determine which keywords are relevant at which temporal period and correlate a current temporal period with the temporal periods from the search log database to identify topics related to the keywords that are likely to be popular at the current temporal period; and
an advertisement server that receives the analysis from the temporal analyzer for selecting the advertisement to display, wherein the advertisement is selected from a plurality of advertisements based on the identified topics that are popular at the current temporal period.

17. The system according to claim 16 wherein the temporal period comprises a date, a time of day, season, or combination thereof.

18. The system according to claim 17 wherein the time of day is a current time, which comprises a current date.

19. The system according to claim 16 further comprising a data source coupled with the search log database and configured to provide additional search keywords to be stored in the search log database.

20. The system according to claim 16 further comprising a user device coupled with the search engine, wherein a user of the user device enters the search keyword and receives the search results for that keyword.

21. The system according to claim 16 further comprising an advertisement server coupled with the search engine and configured to provide an advertisement displayed with the search results, wherein the advertisement is targeted based on at least one identified topic that is popular at the current time.

22. In a computer readable storage medium having stored therein data representing instructions executable by a programmed processor for selecting relevant content, the storage medium comprising instructions operative for:
receiving search queries;
recording the received search queries as search query data in a search log database, wherein the search query data includes a date and time of day for the recorded search queries;
utilizing the search query data to identify date-based topics and time-based topics in the search queries, wherein the date-based topics have popularity influenced by the date and time-based topics have popularity influenced by the time;
identifying, upon receipt of a current search request, one of the date-based topics that corresponds to a date of receipt of the current search request; and
selecting the relevant content for display based on the identified date-based topic.

23. The computer readable medium according to claim 22 wherein the relevant content comprises an advertisement that is displayed with search results from the received search query.

24. The computer readable medium according to claim 22 further comprising:

utilizing the search query data to identify time-based topics in the search queries, wherein the time-based topics have popularity influenced by the time;

identifying, upon receipt of a current search request, one of the time-based topics that corresponds to the time of receipt of the current search request; and selecting the relevant content for display based on the identified time-based topic.

25. A computerized method for selecting a targeted advertisement, the method comprising:

receiving a search query at a search engine;

providing, by the search engine, a search results page with an advertisement slot that includes search results from athe search query;

accessing a search log stored in a search log database that comprises past search queries and a timing for the past search queries;

comparing, with a processor, a current time of the received search query with the search log to identify popular past search queries whose timing corresponds with the current time of the received search query, wherein the timing comprises a season, a date, or a time of day, further wherein popularity is determined based on a number of searches for a past date or past time of day;

analyzing the identified past popular search queries to determine advertisements that are related to the identified past popular search queries; and displaying the targeted advertisement selected from the determined advertisements.

\* \* \* \* \*